Patented Oct. 23, 1934

1,977,982

UNITED STATES PATENT OFFICE 1,977,982

PROCESS FOR THE PREPARATION OF NAPHTHOQUINONE DYES

Hans Theodor Bucherer, Munich, Germany

No Drawing. Application August 14, 1930, Serial No. 475,394. In Germany August 19, 1929

7 Claims. (Cl. 260—56)

This invention relates to a process of producing dyes and dye intermediates of the type containing a naphthoquinone nucleus and to the products so produced.

I have now found that p-azo-dyes of the α naphthols and naphthylamines can be converted into α naphthoquinone derivatives by causing said dyes to undergo an intra-molecular rearrangement followed by a hydrolysis and condensation. I effect this conversion of said dyes by heating the same with a primary aryl amine in an aqueous medium acidified with a weak acid, preferably an organic acid. A particularly advantageous feature of this process resides in the fact that it can be effected in an aqueous medium without the use of organic solvents by merely employing water soluble azo dyes.

The same process can be applied to azo-dyes of β naphthol but the process does not work as smoothly with these substances.

The following examples will serve to more fully illustrate the nature of my invention, though it is to be understood that my invention is not limited thereto.

Example I 33 grams of orange I, having the formula

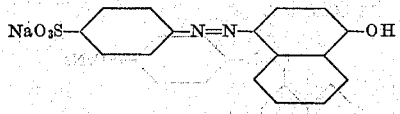

and obtainable by coupling α naphthol with diazotized sulfanilic acid, and 19 gms. of aniline are heated with 330 ccms. of 10% acetic acid under a reflux condenser until the orange I has completely disappeared. The reaction mixture is then cooled whereupon a precipitate is obtained which is filtered from the reaction mixture. This precipitate consists of an anilino-α-naphthoquinone containing slight amounts of sulfanilic acid.

The following equation illustrates the probable nature of the reaction by which said product is formed.

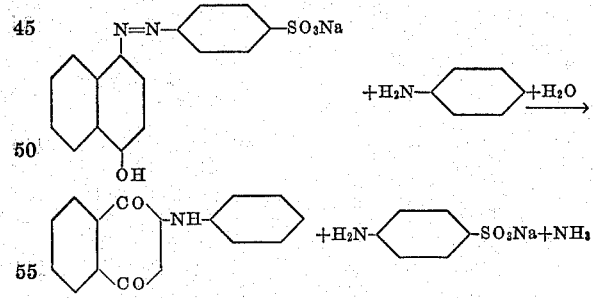

In the presence of larger amounts of aniline there is produced particularly instead of the mono-anilino α naphthoquinone, a naphthoquinone derivatives containing 2 aniline molecules.

Example II

By replacing the aniline in Example I, by p-amino-dimethyl-aniline, the reaction proceeds in a similar manner and yields a condensation product, soluble in hydrochloric acid, which is assumably a dimethyl-amino derivative of the anilino naphthoquinones.

Example III

By replacing the aniline in Example I by a primary amine containing a plurality of amino groups, for example, p-phenylene-diamine, different products are obtained depending upon the relative proportions of amine and azo-dyestuff employed.

Thus if one mol of p-phenylene-diamine is heated with one mol of orange I, a product is obtained which is soluble in hydrochloric acid and which probably is p-amino-anilino-naphthoquinone.

On the other hand, if 2 mols of orange I are employed as against 1 mol of the amine, the condensation product obtained is insoluble in hydrochloric acid. This product vats easily with the conventional hydrosulfite to form baths from which wool especially is dyed dull violet colours.

In a similar manner benzidine reacts with orange I to produce a reddish-tinged vat dye.

Example IV

If the p-amino-dimethyl-aniline of Example II is replaced by its known thio-sulfonic acid derivative, a product containing a thiazine ring is produced. This product is in all probability a thiazin-quinone. A vat of this product dyes wool in bluish-violet tones.

Instead of effecting the molecular rearrangement of the azo-dye and the condensation with the amine in one operation, it is possible to attain the same end by first heating the azo-dye, orange I, with a 10% acetic acid solution until the dye disappears, to thereby cause the molecular rearrangement of the dye with the production of anilino-naphthoquinone sulfonic acid thus:

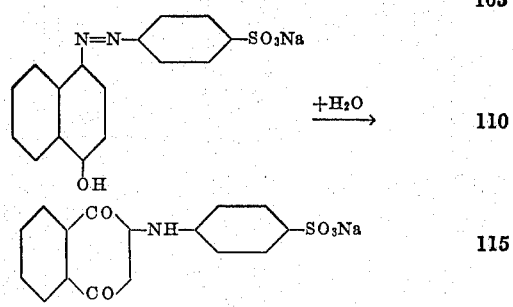

By subsequently heating this product with an amine, such as aniline, the same replaces the sulfanilic acid residue to yield the anilino-α-naphthoquinone, thus:

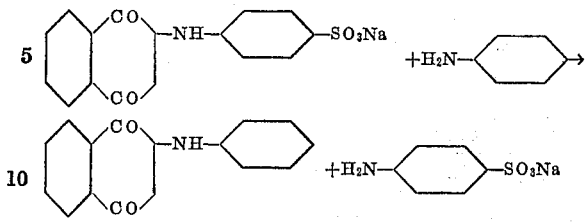

In this way it is possible to obtain the mono-arylido-naphthoquinones of greater uniformity (compare on the other hand Example I).

Similarly it is possible to convert the intermediate product of Example III, obtained by condensing 1 mol of orange I with 1 mol of p-phenylene-diamine, into the vat dyestuff of that example. Instead of reacting said first product with an additional mol of orange I, the primary transformation product of orange I, that is, the sulfonic acid of anilino-naphthoquinone, mentioned above, may be used. Likewise, other suitable p-azo-dyes of the naphthols may be employed.

It is to be understood that while I have disclosed a preferred embodiment of my invention, I do not intend to be limited to the patent granted thereon, except as necessitated by the prior art.

What I claim is:—

1. The process of producing dyes and dye intermediates which comprises heating a p-azo-dye of a substance selected from the class consisting of α-naphthol, α-naphthylamine and such derivatives of alpha naphthol and alpha naphthylamine as contain the sulfo groups, carboxyl groups, chlorine groups and methoxyl groups, together with a primary aryl amine in an aqueous medium acidified by a water soluble organic carbonic acid selected from the class consisting of formic acid, acetic acid, tartaric acid and citric acid, and continuing the heating until said p-azo-dye disappears.

2. The process of producing dyes and dye intermediates which comprises refluxing a p-azo-dye of α-naphthol with a primary aryl amine in an aqueous medium acidified with a water soluble organic carbonic acid selected from the class consisting of formic acid, acetic acid, tartaric acid and citric acid, and continuing the heating until said p-azo-dye disappears.

3. The process defined in claim 2, wherein the p-azo-dye is heated with a primary diamine of the aromatic series of the p-phenylendiamine and benzidine type.

4. The process as defined in claim 2, wherein 1 mol of orange I having the formula

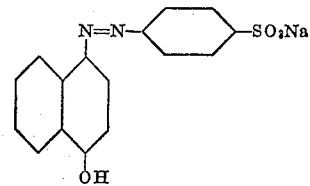

is heated with 1 mol of p-phenylene-diamine.

5. The process of producing dyes and dye intermediates which comprises heating orange I having the formula

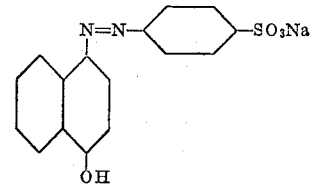

and aniline in an aqueous medium acidified with a 10% solution of acetic acid until said orange I disappears.

6. The process of producing dyes and dye intermediates which comprises heating a p-azo-dyestuff of a substance selected from the class consisting of α-naphthol, α-naphthylamine and such derivatives of alpha naphthol and alpha naphthylamine as contain the sulfo groups, carboxyl groups, chlorine groups and methoxyl groups, in an acid medium selected from the class consisting of formic acid, acetic acid, tartaric acid and citric acid, continuing the heating until said dyestuff disappears to thereby convert the same into an α-naphthoquinone derivative and condensing said derivative with a primary amine.

7. The process of producing dyes and dye intermediates which comprises heating orange I having the formula

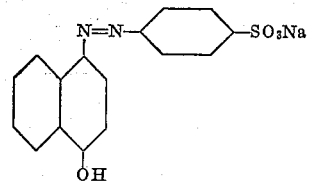

in an aqueous medium acidified with 10% acetic acid, continuing the heating until said orange I disappears to convert the same into anilino-naphthoquinone sulfonic acid and condensing said product with aniline.

HANS THEODOR BUCHERER.